United States Patent
Handing et al.

(10) Patent No.: US 10,005,411 B2
(45) Date of Patent: Jun. 26, 2018

(54) BUMPER SYSTEM FOR A MOTOR VEHICLE

(71) Applicant: BENTELER AUTOMOBILTECHNIK GMBH, Paderborn (DE)

(72) Inventors: Christian Handing, Langenberg (DE); Mirko Paare, Paderborn (DE)

(73) Assignee: BENTELER AUTOMOBILTECHNIK GMBH (DE)

( * ) Notice: Subject to any disclaimer, the term of this patent is extended or adjusted under 35 U.S.C. 154(b) by 0 days. days.

(21) Appl. No.: 15/067,918

(22) Filed: Mar. 11, 2016

(65) Prior Publication Data
US 2016/0264084 A1  Sep. 15, 2016

(30) Foreign Application Priority Data

Mar. 13, 2015  (DE) .......... 10 2015 103 755

(51) Int. Cl.
| | |
|---|---|
| *B62D 27/02* | (2006.01) |
| *B62D 25/14* | (2006.01) |
| *B62D 25/08* | (2006.01) |
| *B60R 19/34* | (2006.01) |
| *B60R 19/24* | (2006.01) |

(52) U.S. Cl.
CPC .............. *B60R 19/34* (2013.01); *B60R 19/24* (2013.01)

(58) Field of Classification Search
CPC ... B60R 19/34; B60R 19/18; B60R 2019/247; B60R 19/023; B60R 19/03; B60R 19/24; B60R 2019/1813
USPC ....... 293/133, 120, 132, 154, 115, 117, 127; 296/187.09, 70, 193.02, 205, 187.05
See application file for complete search history.

(56) References Cited

U.S. PATENT DOCUMENTS

| | | | |
|---|---|---|---|
| 6,318,775 B1 | 11/2001 | Heatherington et al. | |
| 7,147,258 B2* | 12/2006 | Evans ..................... | B60R 19/18 293/120 |
| 7,802,829 B2* | 9/2010 | Maus ...................... | B60D 1/04 293/132 |
| 2012/0104777 A1* | 5/2012 | Ghannam ............... | B60R 19/34 293/133 |

(Continued)

FOREIGN PATENT DOCUMENTS

| | | |
|---|---|---|
| DE | 195 45 069 A1 | 4/1997 |
| DE | 196 11 934 C1 | 4/1997 |

*Primary Examiner* — D Glenn Dayoan
*Assistant Examiner* — Sunsurraye Westbrook
(74) *Attorney, Agent, or Firm* — Sheridan Ross P.C.

(57) ABSTRACT

The invention concerns a bumper system for a motor vehicle with at least one crashbox, which is arranged by means of a bracket on a bumper cross member, wherein the bracket is provided with a first bracket plate and a second bracket plate, while the first bracket plate bears at least partly against a first limiting element and the second bracket plate against a second limiting element of the bumper cross member, wherein the bumper cross member is taken up in the bracket such that the first bracket plate and/or the second bracket plate extends in the direction of the vehicle longitudinal axis over at least ¾ preferably over 9/10 of the bumper cross member in the direction of a bumper cross member front wall, especially preferably entirely up to the bumper cross member front wall.

13 Claims, 7 Drawing Sheets

(56) References Cited

U.S. PATENT DOCUMENTS

2014/0015265 A1\* 1/2014 Ahn ........................ B60R 19/34
293/133

\* cited by examiner

BUMPER SYSTEM FOR A MOTOR VEHICLE

CROSS-REFERENCE TO RELATED APPLICATIONS

This application claims the benefit of German Patent Application No. DE 10 2015 103 755.6, filed Mar. 13, 2015, the entire contents of which are incorporated herein by reference.

FIELD

The invention concerns a bumper system for a motor vehicle according to the preamble of patent claim 1.

BACKGROUND

Such a bumper system is known, for example, from DE 10 2004 013 713 A1 and DE 10 2004 056 249 A1. In both publications, a C-shaped bracket welded to the crashbox is arranged on a bumper cross member. The C-shaped bracket profiles of these bumper systems are arranged with an upper bracket plate and a lower bracket plate in the rear region, facing the middle of the vehicle, of an upper and a lower boundary wall of the bumper cross member. The arrangement of the brackets on the bumper cross member is accomplished by means of a detachable screw connection. By means of this screw connection, the bumper cross member can be detached from the brackets, which is especially advantageous when the bumper cross member needs to be replaced as a result of an accident of the motor vehicle.

Such bumper systems for motor vehicles have a defined deformation behavior in event of an accident. Already in the 1980s the Alliance Center for Technology (AZT) had developed a crash repair test with the goal of lessening the damage to a vehicle in event of traffic accidents. To the present day, this test forms the basis for the type classification of insurance companies. Vehicle makers use it when developing new vehicle models, and car owners profit from it through less vehicle damage in event of a traffic accident. With the AZT crash repair test, a foundation has been created for the achievement of a good deformation behavior, which has already been introduced in 1999 in an international association of research institutes and been adopted there as an international standard. It has been further developed under the title of the RCAR (Research Council for Automobile Repairs) test.

In the two aforementioned publications, however, a defined high force level in the AZT loading test with correspondingly defined application of energy to the bumper system cannot be realized with sufficient predictability due to the connection of the brackets to the bumper cross member. In particular, this becomes very difficult when the bumper cross member is an aluminum profile, which is relatively soft and is uncontrollably deformed in the first millimeters of the deformation in the loading test, so that little or no predictable energy application and little intrusion into the bumper system is the result.

SUMMARY

It is therefore the problem of the invention to further develop a bumper system for motor vehicles of the kind mentioned above so that a defined high force level can be diverted in a controlled manner into the bodywork in the AZT loading test, so that the further damage to the vehicle can be kept low. In this way, it would be possible not only to hold down the costs to the car owner or the insurance company, but also a resource-sparing bumper system would be achieved, since replacement parts could be economized.

This problem is solved by a bumper system with all the features of patent claim 1. Advantageous embodiments of the invention are found in the subsidiary claims.

The bumper system according to the invention for a motor vehicle has at least one crashbox, which is arranged by means of a bracket on a bumper cross member. The bracket is provided with a first bracket plate and a second bracket plate, while the first bracket plate bears at least partly against a first limiting element and the second bracket plate against a second limiting element of the bumper cross member. According to the invention, now, the bumper cross member is taken up in the bracket such that the first bracket plate and/or the second bracket plate extends in the direction of the vehicle longitudinal axis over at least $3/4$ preferably over $9/10$ of the bumper cross member (3) in the direction of a bumper cross member front wall (10), especially preferably entirely up to the bumper cross member front wall.

Thanks to this configuration of the bumper system according to the invention for motor vehicles, there is now a direct and very specifically predictable application of deformation energy to the bracket in event of loading in the region of the crashboxes, since the bracket extends as far as the bumper cross member front wall. The bumper cross member then is unable to be deformed in event of loading in the region of the connection to the bracket without there being an application of energy directly to the bracket and thus to the crashbox, the bumper system and the bodywork. Thus, because the energy is applied directly to the crashbox, the energy can be very specifically absorbed and routed to the crashbox in event of loading, so that damage is minimized in the region outside of the crashbox, the bracket and the bumper cross member. Thus, an increasing of the force level is achieved, so that a greater energy diversion or energy absorption in the bumper cross member is achieved. This makes it possible to minimize further costs for the car owner or the insurance company in event of an accident, since damage outside of the bumper system is also substantially reduced by the invention. This, furthermore, produces a resource-sparing bumper system, since significantly fewer parts outside of the bumper system need to be replaced in event of accidents in the case of motor vehicles with the bumper system according to the invention, as these are much less damaged on account of the very specific energy or deformation application to the bumper system than in the case of bumper systems known from the prior art.

According to a first advantageous configuration of the invention, the first bracket plate is configured as an upper bracket plate and the second bracket plate as a lower bracket plate, which are connected or joined together across a rear bracket plate and/or a side bracket plate.

According to another advantageous configuration of the invention, the bumper cross member front wall is provided with a flange, which extends at least in the region of the at least one crashbox in the direction of the vehicle vertical axis by an upper end toward the top and/or by a lower end toward the bottom beyond the rest of the bumper cross member. This embodiment of the invention also further increases the specific energy application to the crashbox in event of an accident or a loading event. This flange ensures that the bumper cross member applies its deformation already at the start of a loading event to the bracket and thus to the crashbox and thereby further reduces damage to vehicle parts outside of the bumper system.

Furthermore, it has proven to be advantageous for the flange of the bumper cross member front wall to be shaped so that it is deformed in the direction of the vehicle longitudinal axis toward the middle of the vehicle by its upper end and/or lower end extending in the direction of the vehicle vertical axis beyond the rest of the bumper cross member. Thanks to this special shape of the flange at its ends projecting beyond the bumper cross member, an additional form closure or hooking of these ends and thus of the flange to the upper and/or lower bracket plate in event of a crash is achieved, so that in this way as well the deformation energy can be diverted especially easily and in a targeted manner, which in turn reduces later repair costs and thus also economizes on resources in the form of replacement parts.

For even better diverting of the applied energy to the crashbox, the upper end of the flange can conform snug against the upper bracket plate and/or the lower end of the flange against the lower bracket plate, especially by their full surface.

The bumper system according to the invention is especially advantageous for a motor vehicle when the bumper cross member is fashioned as an aluminum profile, especially as a single-chamber aluminum profile or multichamber aluminum profile and optionally with additional three-dimensional deformations and/or curvatures. By fashioning the bumper cross member as an aluminum profile one provides an especially light bumper system, yet one which results in very fast deformation of the bumper cross member on account of the physical properties of aluminum when subjected to a load. Thanks to the special connection of the bracket to the bumper cross member when using aluminum profiles as the bumper cross member, one now achieves according to the invention a very targeted and predictable diverting of the energy into the bumper system, especially the crashbox, in event of a crash, despite the weight savings. In this way, the use of aluminum can furthermore achieve a weight saving and thus a substantial decrease in the operating costs of the motor vehicle, without having to sacrifice a defined and predictable diverting of energy into the bumper system or the crashbox in event of an accident.

In order to likewise enhance the stability of the bumper cross member, it has proven to be advantageous to provide the bumper cross member along its longitudinal dimension transversely to the vehicle longitudinal axis with at least one preferably continuous bead or longitudinal furrow in the front wall and/or the rear wall of the bumper cross member. Such beads or longitudinal furrows substantially increase the stability of a hollow profile of the bumper cross member without additional use of material. It is also possible to economize on resources in event of a crash and accomplish a resource-saving operation of the motor vehicle.

Serving the same purpose is an embodiment of the invention in which the crashbox is provided in the direction of the vehicle longitudinal axis with longitudinal beads. This also further increases the stability and the force level, or energy absorption, of the entire bumper system. Thanks to corrugations and transverse beads parallel to the vehicle vertical axis or transverse axis, the diverting of energy and the course of the deformation in a loading situation can be steered in an even more targeted manner into the bumper system or the crashbox.

Advantageously in this case the crashbox consists of at least one steel sheet shell, preferably a left steel sheet shell and a right steel sheet shell preferably joined by positive connection through welding, while the cross section of the crashbox transversely to the vehicle longitudinal axis is polygonal, especially rectangular with rounded corners. This embodiment of the invention also serves to give the bumper system a heightened stability, while the rounded corners of the polygonal cross section of the crashbox in particular further minimize the damage to other elements of the motor vehicle in a loading situation.

Advantageously, the bracket is also formed from a steel sheet and is connected positively, especially by welding, to the crashbox, while the bracket is provided in at least one connection region to the bumper cross member with a galvanized coating. The galvanized coating serves in particular for corrosion protection, since the bumper cross member to which the bracket is joined consists of aluminum and therefore a corrosion of the steel might otherwise occur, given the physical and chemical properties of aluminum and steel when placed in direct contact, which would result in a no longer functionally fit bumper system. The galvanized coating can also be used for the soldering of bracket and bumper cross member, if a reversible connection is not desired or not necessary.

The bracket here is non-positively but detachably connected to the bumper cross member, especially by a screw connection. Such a detachable connection as a screw connection, to which the invention should not be reduced, makes it possible to replace a damaged bumper cross member in event of an accident, without having to replace the rest of the bumper system, if it is still serviceable.

Furthermore, it can be provided that the rear bracket plate is outfitted with a through opening, especially for the passage of a towing device or a towing eyelet.

Advantageously, the side bracket plate is joined to the upper bracket plate and/or the lower bracket plate, especially by means of a weld seam.

Further goals, benefits, features and application possibilities of the present invention will emerge from the following description of a sample embodiment with the help of the drawing. All features described and/or depicted form the subject matter of the present invention by themselves or in any meaningful combination, even independently of their summarization in the claims or their reference back to them.

DETAILED DESCRIPTION

Figure 9:
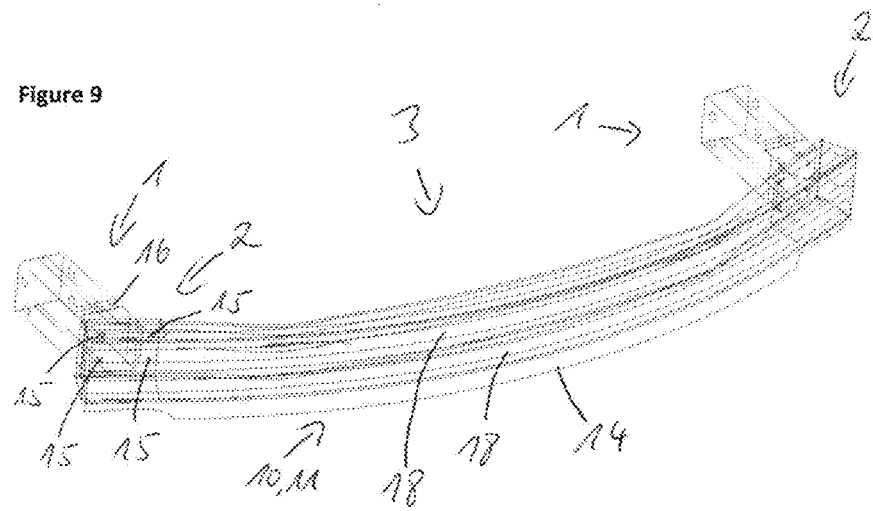
Figure 10:
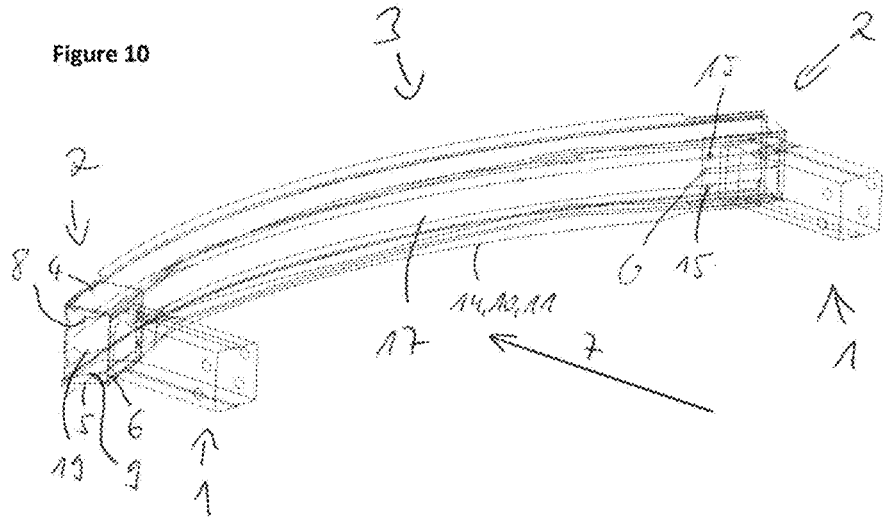

In FIGS. 9 and 10 a sample embodiment of a bumper system according to the invention for a motor vehicle is represented as a wire lattice model, where the bumper system there has a bumper cross member 3, which is configured as a multichamber profile. The bumper cross member 3 there has an upper boundary wall 8, a lower boundary wall 9 and a bumper cross member front wall 10 and a bumper cross member rear wall 17.

The bumper cross member 3 is essentially rectangular in configuration and is bent or curved along its longitudinal dimension. Within the bumper cross member 3 fashioned as a multichamber profile there is arranged a corrugated partition wall 19, which connects the bumper cross member front wall 10 to the bumper cross member rear wall 17. The partition wall 19 here is arranged in the middle of the bumper cross member 3.

The bumper cross member front wall 10 has two continuous beads 18 along its entire longitudinal dimension, which enhance the stability of the bumper cross member 3. The present bumper cross member 3 is fashioned as a hollow aluminum profile, at each end of which is arranged a crashbox 1 by means of a bracket 2. Both the brackets 2 and the crashboxes 1 are made from a steel sheet.

While the brackets 2 are connected to the crashboxes 3 positively by means of welding, the brackets 2 are screwed together with the bumper cross member 3 non-positively yet detachably at fastening points 15. Thanks to such screw connections, damaged bumper cross members 3 after an accident can be easily detached from the bumper system and replaced with a new bumper cross member 3. One recognizes here a screw connection at four fastening points 15 of the rear bracket plate 6.

Figure 7:
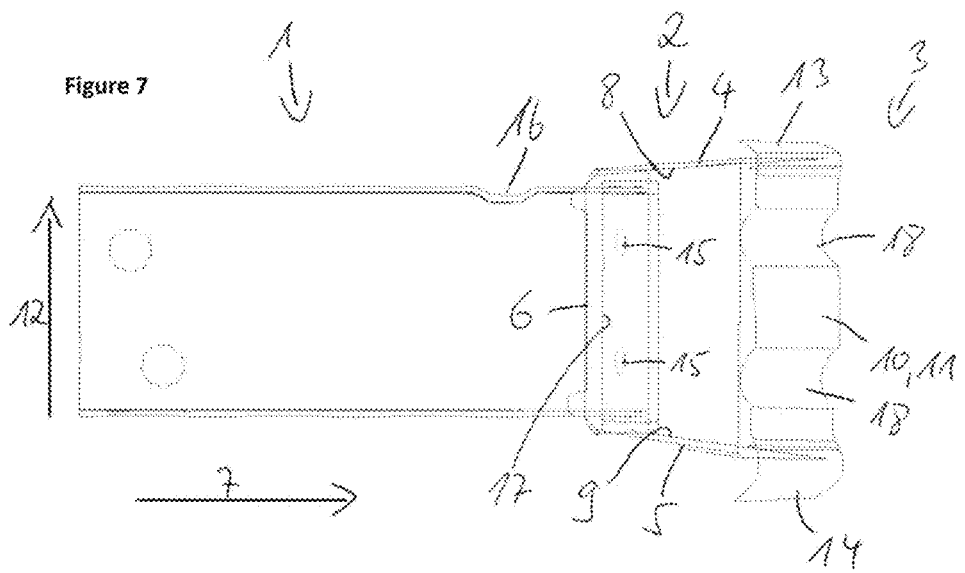
Figure 8:
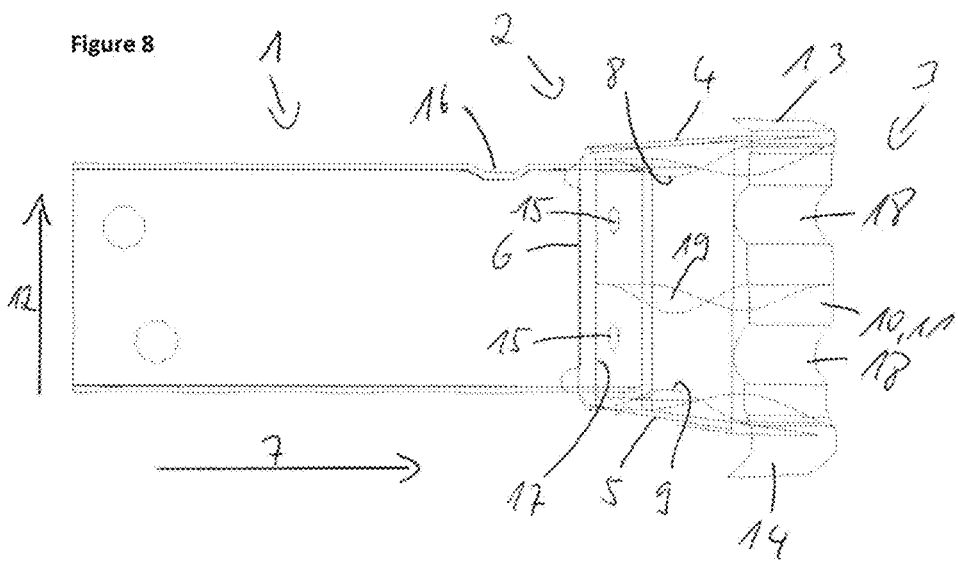

In FIGS. 7 and 8 a bumper system according to the invention per FIGS. 9 and 10 is represented in a side view, while in FIG. 7 the bumper cross member 3 is represented as a single-chamber hollow profile without partition wall 19 and in FIG. 8 the bumper cross member 3 is represented as a multichamber hollow profile with partition wall 19. It can be clearly recognized in FIGS. 7 and 8 how the bracket 2 is arranged by an upper bracket plate 4 against an upper corrugated boundary wall 8 of the bumper cross member 3, while a lower bracket wall 5 is arranged against a lower corrugated boundary wall 9 of the bumper cross member 3. The upper bracket plate 4 here lies partly against the upper boundary wall 8 and the lower bracket plate 5 partly against the lower boundary wall 9.

The lower bracket plate 5 is connected to the upper bracket plate 4 by a rear bracket plate 6 and fashioned as a single piece, while the rear bracket plate 6 lies flat against a bumper cross member rear wall 17 and the bracket 2 is arranged here detachably by means of screw connections at the fastening points 15 on the bumper cross member 3.

Both the upper bracket plate 4 and the lower bracket plate 5 extend from the bumper cross member rear wall 17 to the bumper cross member front wall 10. The bumper cross member front wall 10 is fashioned with a flange 11, which extends in the direction of the vehicle vertical axis 12 beyond the rest of the bumper cross member 3 by a lower end 14 and an upper end 13.

The cross section and/or a depth $T_1$ of the bumper cross member 3 is reduced in the region of its connection to the bracket 2 or the crashbox 1 as compared to the rest of its cross section or its other depth T. This assures a better energy diversion or reproducible deformation behavior in event of a crash.

As is especially noticeable from FIGS. 7 and 8 and also from FIGS. 1 to 6, the upper end 13 and the lower end 14 of the flange 11 are formed toward the middle of the vehicle in the region of the connection of the bumper cross member 3 to the bracket 2 or the crashbox 1 in the direction of the vehicle longitudinal axis 7. This means that the upper bracket plate 4 and the lower bracket plate 5 in event of an accident make contact at once with the flange 11 in the region of its upper end 13 and its lower end 14, so that a very targeted and quick energy application occurs in the crashbox 1 or the bumper system and the bodywork and the lower bracket plate 5 as well as the upper bracket plate 4 are braced against the shifted flange 11 and interlock with it. This also prevents a sliding of the bumper cross member 3 relative to the bracket 2.

The crashbox 1 in the sample embodiments of the figures has each time a transverse bead 16 in the region of its upper boundary wall. This transverse bead 16 likewise serves for enhanced stability of the overall bumper system.

FIGS. 1 to 6 show detail views of a sample embodiment of a bumper system according to the invention, the bracket 2 being welded to the crashbox 1 and the bumper cross member 3 being detachably connected to the bracket 2 by means of screw connections at the fastening points 15.

Figure 1:
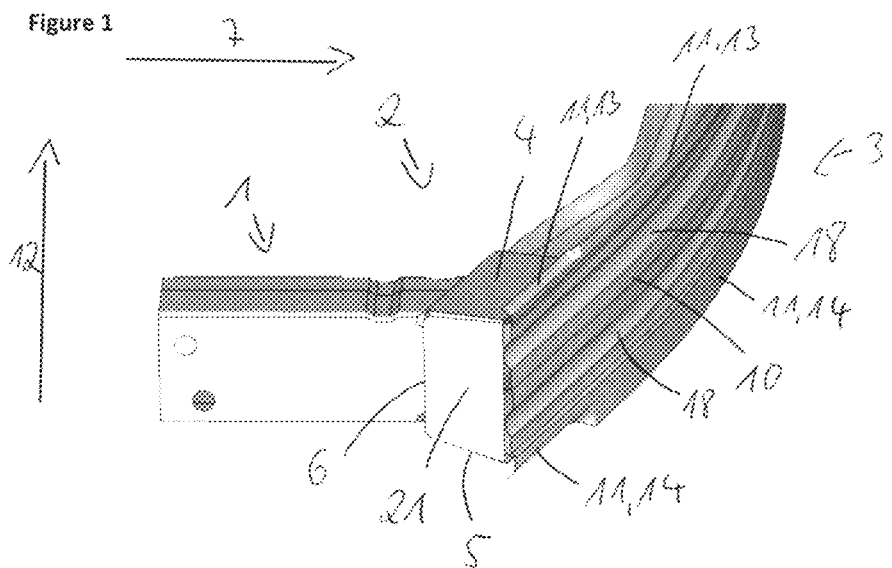
FIGS. 1 to 10: various representations of bumper systems according to the invention for a motor vehicle.
Figure 4:
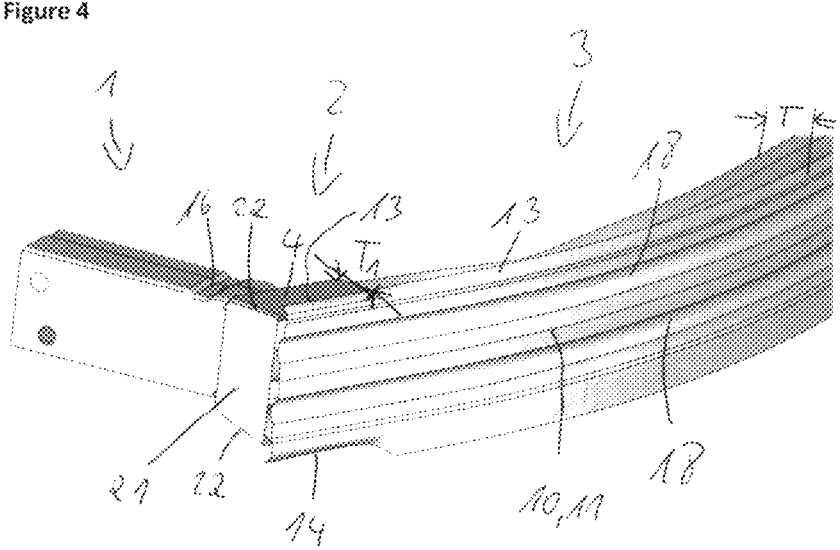
Figure 5:
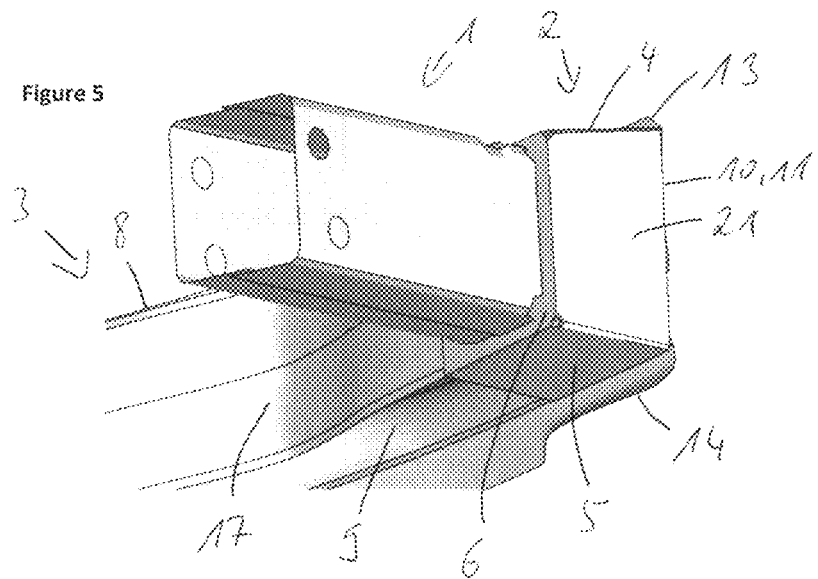
Figure 6:
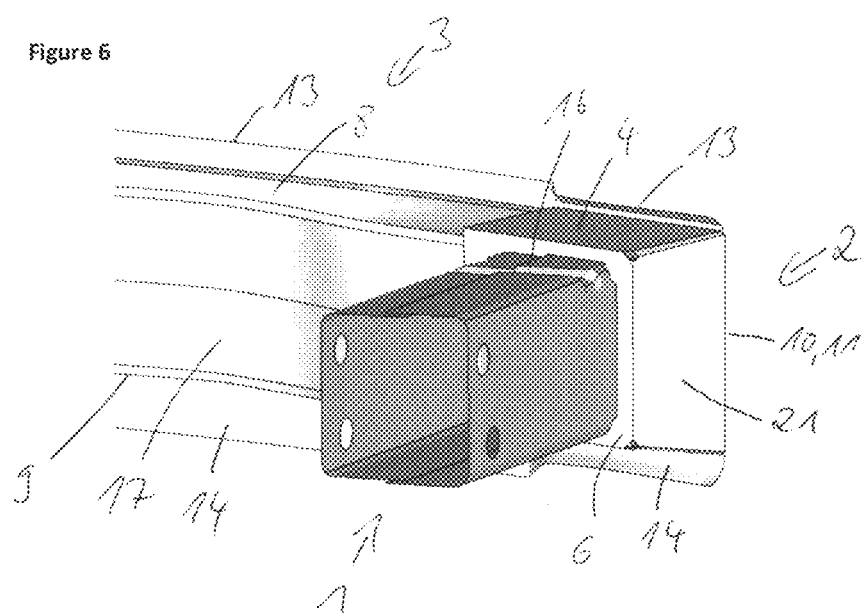

In FIG. 1 and FIG. 4 one can furthermore see a side bracket plate 21 which is joined by a weld seam to the upper bracket plate 4 and the lower bracket plate 5.

Figure 2:
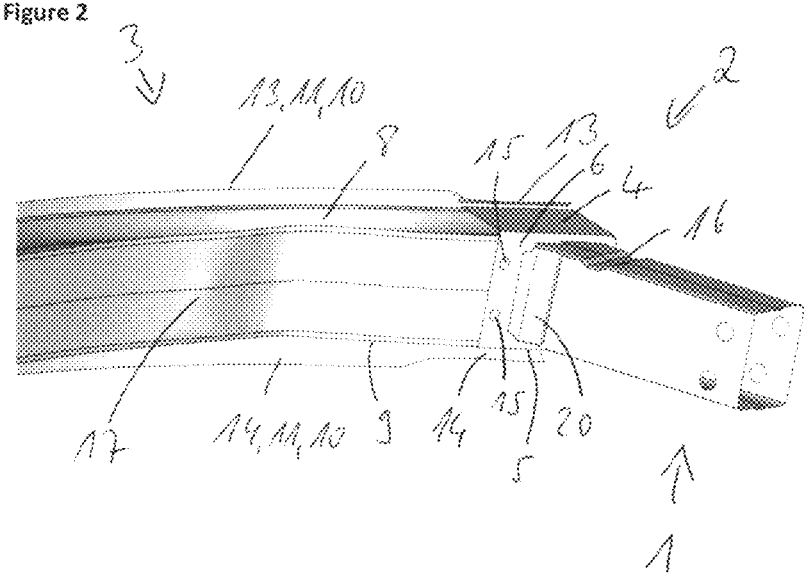
Figure 3:
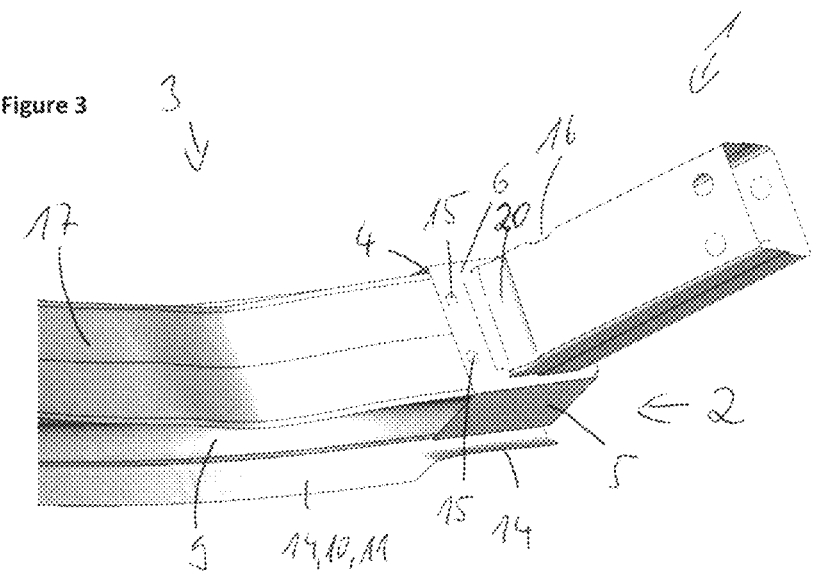

Moreover, especially in FIGS. 2 and 3 one can also recognize a further transverse bead 20 at the inner wall of the crashbox 1, which serves to steer the deformation during a crash.

Likewise, one especially notes in FIGS. 1 to 6 that the upper end 13 and the lower end 14 of the flange 11 are fashioned curved or bent in the direction of the center of the vehicle in the region of the connection of the bumper cross member 3 to the bracket 2. This accomplishes an additional form closure or an interlocking in event of a crash, which furthermore enables a relieving of the connection to the crashbox 1. Moreover, such a configuration of the upper end 13 and the lower end 14 of the flange further heightens the stability of the bumper cross member 3 and thus the entire bumper system and enables a more targeted application of energy to the bumper system in event of a crash.

In FIGS. 1 to 6 one likewise notices that the crashbox 1 is formed from two steel sheet shells, which are joined positively by welding.

Figure 11A:
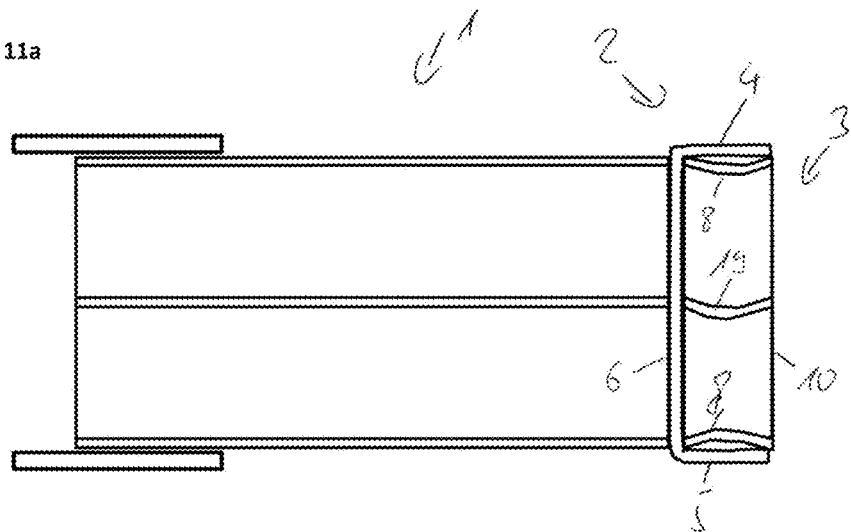
FIG. 11a: a cutout representation of another embodiment of the invention as an aluminum bumper system in a longitudinal section.
Figure 11B:
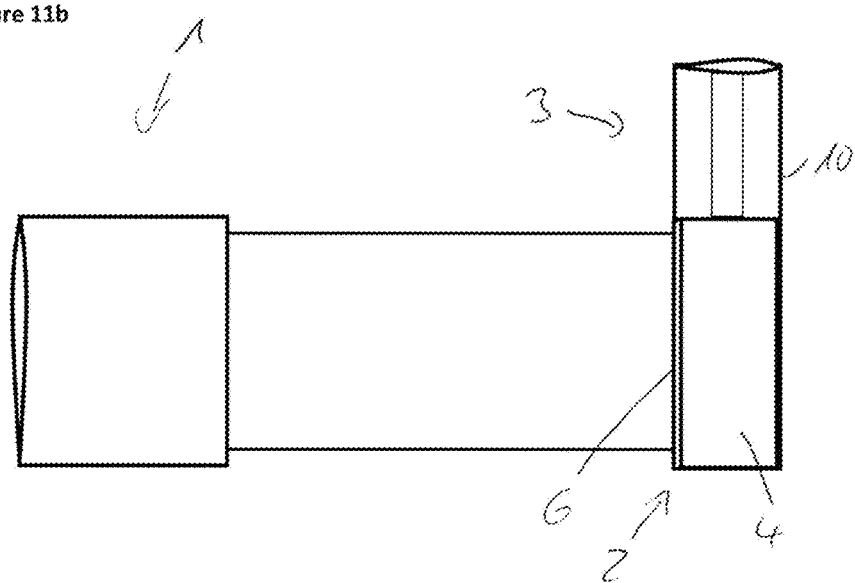
FIG. 11b: the aluminum bumper system of FIG. 11a in a top view.

FIGS. 11*a* and 11*b* show a cutout view of another embodiment of the invention as an aluminum bumper system in a longitudinal section (FIG. 11*a*) and in a top view (FIG. 11*b*). A bumper cross member 3 with two hollow chambers fashioned in its direction of longitudinal dimension is grasped by a bracket 2 in the rear, while an upper bracket plate 4 of the bracket 2 spans and partially contacts an upper boundary wall 8 of the bumper cross member and a lower bracket plate 5 spans and partially contacts a lower boundary wall 9 of the bumper cross member 3. Both the upper and lower boundary walls 8 and 9 as well as a partition wall 19 have a longitudinal furrow 23 only in the connection region to the crashbox 1. The bracket 2 is positively coupled to an aluminum crashbox 1 fashioned as a multichamber profile and has a partition wall in longitudinal section, as well as two hollow chambers. The crashbox 1 itself is arranged in a lengthwise section of a longitudinal beam of the vehicle bodywork and secured to it by screw bolts. These are indicated in FIG. 11*b*.

Figure 12:
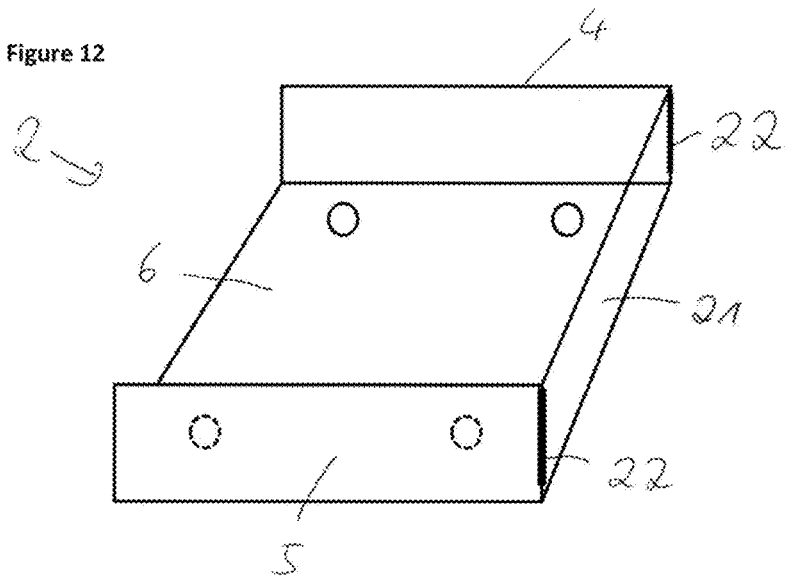
FIG. 12: a configuration of the bracket 2 of a bumper system according to the invention.

FIG. 12 shows a configuration of the bracket 2 with an upper bracket plate 4, a lower bracket plate 5, a side bracket plate 21 and a rear bracket plate 6, the latter having openings for screwing together with a rear wall of the bumper cross member. The neighboring upper and lower bracket walls at the side are joined by weld seams 22.

Figure 13:
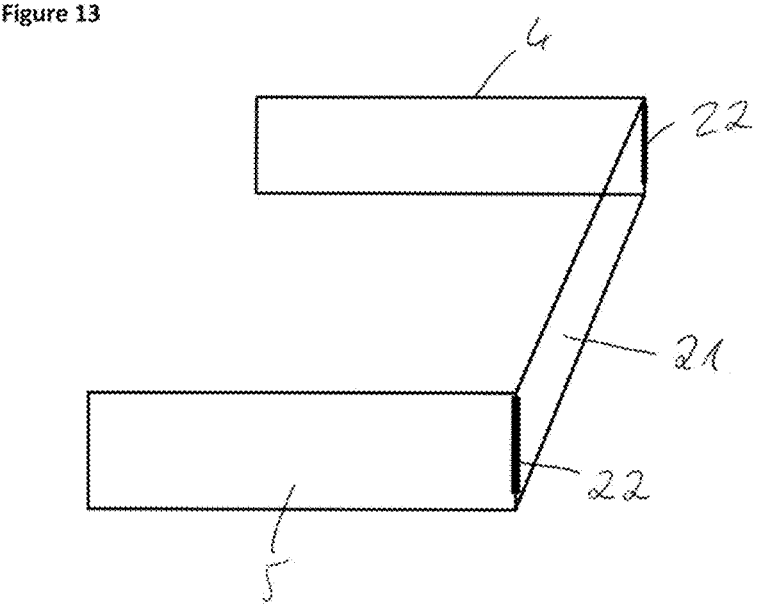
FIG. 13: an alternative configuration of the bracket 2 of a bumper system according to the invention.

FIG. 13 shows an alternative configuration of the bracket 2, which differs from the previously mentioned configuration by not having the rear bracket plate, resulting in a lighter bumper system.

LIST OF REFERENCE SYMBOLS

1 Crashbox
2 Bracket

3 Bumper cross member
4 First bracket plate
5 Second bracket plate
6 Rear bracket plate
7 Vehicle longitudinal axis
8 Boundary wall/limiting element
9 Boundary wall/limiting element
10 Bumper cross member front wall
11 Flange
12 Vehicle vertical axis
13 Upper end
14 Lower end
15 Fastening points
16 Transverse bead
17 Bumper cross member rear wall
18 Longitudinal bead
19 Partition wall
20 Transverse bead
21 Side bracket plate
22 Weld seam
T Depth
$T_1$ Depth

What is claimed is:

1. A bumper system for a motor vehicle, comprising:
a bracket including a first bracket plate and a second bracket plate;
a bumper cross member including a first limiting element on a first side of the bumper cross member and a second limiting element on a second side of the bumper cross member, the second side being opposite to the first side; and
at least one crashbox, which is attached to the bumper cross member by the bracket and that extends in a direction of a vehicle longitudinal axis, wherein the first bracket plate bears at least partly against the first limiting element and the second bracket plate bears at least partly against the second limiting element, wherein the bumper cross member extends in a direction perpendicular to the direction of the vehicle longitudinal axis and is taken up in the bracket such that at least one of the first bracket plate and the second bracket plate extends in the direction of the vehicle longitudinal axis over at least ¾ of the bumper cross member in a direction of a front wall of the bumper cross member.

2. The bumper system as claimed in claim 1, wherein the first bracket plate is configured as an upper bracket plate and the second bracket plate as a lower bracket plate, which are connected together across a rear bracket plate and/or a side bracket plate.

3. The bumper system as claimed in claim 1, wherein the bumper cross member front wall is provided with a flange, which extends at least in the region of the at least one crashbox in the direction of a vehicle vertical axis by an upper end toward the top and/or by a lower end toward the bottom beyond the rest of the bumper cross member.

4. The bumper system as claimed in claim 3, wherein the flange of the bumper cross member front wall is shaped at least in the region of the crashbox so that it is formed contrary to the direction of the vehicle longitudinal axis toward a passenger compartment by its upper end and/or lower end extending in the direction of the vehicle vertical axis beyond the rest of the bumper cross member.

5. The bumper system as claimed in claim 1, wherein the bumper cross member is fashioned as one of a single-chamber aluminum profile, and multichamber aluminum profile with additional three-dimensional deformations and/or curvatures.

6. The bumper system as claimed in claim 1, wherein the bumper cross member along its longitudinal dimension transverse to the vehicle longitudinal axis is provided with at least one continuous bead or longitudinal furrow.

7. The bumper system as claimed in claim 1, wherein the crashbox consists of at least one steel sheet shell that includes a left steel sheet shell and a right steel sheet shell joined by positive connection through welding, while the cross section of the crashbox transversely to the vehicle longitudinal axis is polygonal, rectangular with rounded corners.

8. The bumper system as claimed in claim 1, wherein the bracket is formed from a steel sheet and/or is connected positively by welding, to the crashbox, while the bracket is provided in at least one connection region to the bumper cross member with a galvanized coating.

9. The bumper system as claimed in claim 1, wherein the bracket is non-positively connected to the bumper cross member by a screw connection.

10. The bumper system as claimed in claim 2, wherein the rear bracket plate is outfitted with a through opening for the passage of a towing device or a towing eyelet.

11. The bumper system as claimed in claim 2, wherein the side bracket plate is joined to the upper bracket plate and/or the lower bracket plate by means of a weld seam.

12. The bumper system as claimed in claim 1, wherein the bumper cross member is taken up in the bracket such that at least one of the first bracket plate and the second bracket plate extends in the direction of the vehicle longitudinal axis over 9/10 of the bumper cross member in the direction of the front wall of the bumper cross member.

13. The bumper system as claimed in claim 1, wherein the first bracket plate and the second bracket plate overlap in a direction of a vehicle vertical axis.

* * * * *